United States Patent Office 3,255,132
Patented June 7, 1966

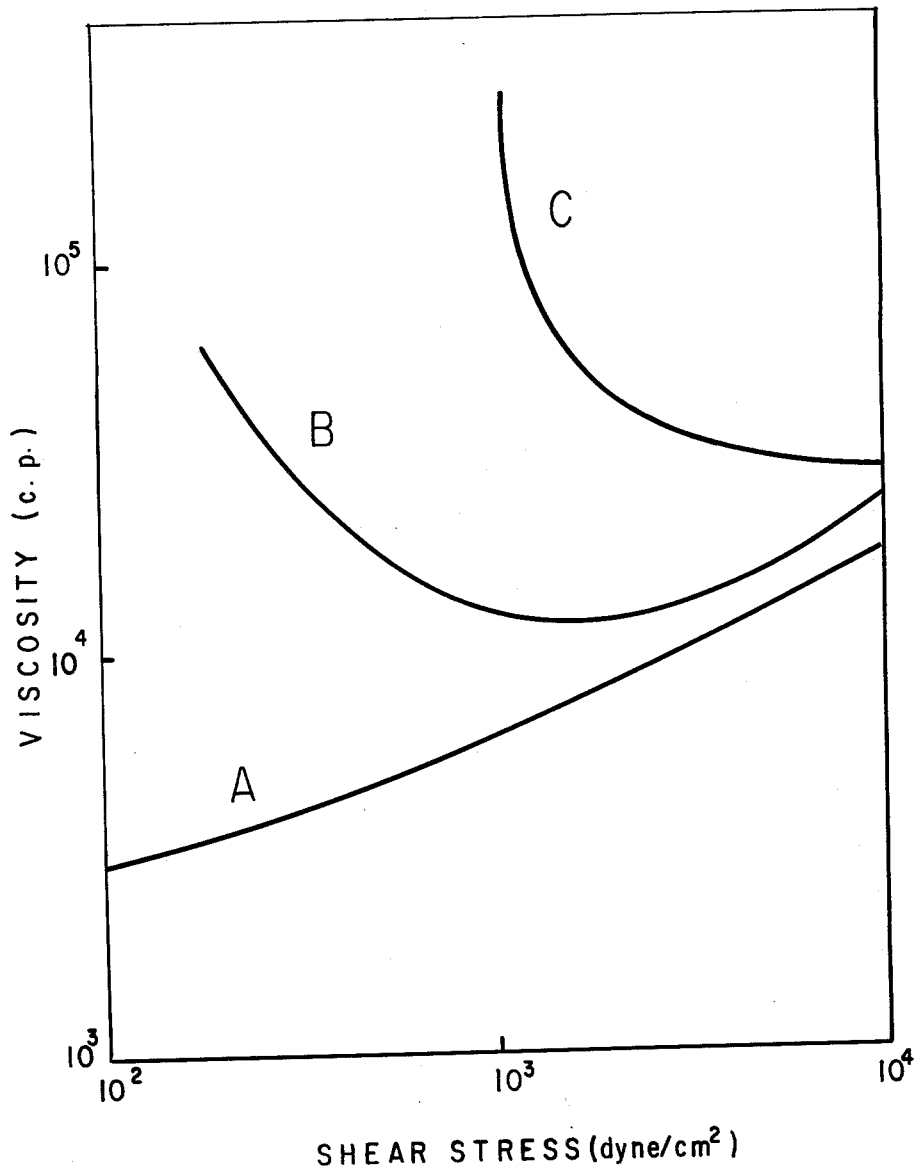

3,255,132
VINYL CHLORIDE POLYMERS DRIED IN THE PRESENCE OF METAL IONS AND AMMONIUM SALTS OF MONOCARBOXYLIC ACIDS
Herbert Reinecke, Burghausen, Upper Bavaria, Germany, assignor to Wacker-Chemie G.m.b.H., Munich, Germany, a German firm
Filed Oct. 3, 1961, Ser. No. 142,559
Claims priority, application Germany, July 20, 1961, W 30,387
8 Claims. (Cl. 260—23)

This invention relates to a process for the preparation of polymers of vinylchloride or of copolymers containing at least 80% by weight of vinylchloride, which polymers are capable of forming dispersions or pastes. It also relates to vinylchloride polymers or copolymers which can be dispersed in plasticizers, optionally with concurrent use of organic diluents which do not dissolve or swell or only slightly dissolve or swell the polymers, which dispersion is accompanied by formation of pastes, plastisols or organosols. These dispersions are commonly referred to as vinyl pastes.

The flow properties of the vinyl pastes desired by the manufacturer differ, depending upon their employment. Thus, in general, a paste wtih pseudo-plastic flow properties, that is, a paste whose viscosity decreases with increasing shear, is preferred for processes involving brushing or spread coatings. For rotation molding or for dip coating a paste with dilatant flow properties is preferred. That is, a paste whose viscosity increases with rising shear. In all cases the paste should undergo as little change as possible during storage. For purposes involving brushing or spread coatings, polyvinylchloride with a small primary particle size has been heretofore chiefly used by the manufacturers. The desired pseudo-plastic flow property was achieved upon mixing with plasticizers but poor storage properties of the paste had to be accepted.

It is an object of the present invention to control the flow properties of vinyl pastes independently of the particle size and particle size distribution of the polymerizate employed.

Another object of the invention is the obtention of a vinyl polymer adapted for the preparation of dispersions of (1) vinyl polymers selected from the group consisting of polyvinylchloride and copolymers of vinylchloride containing at least 80% by weight of vinylchloride and (2) softeners selected from the group consisting of plasticizers, mixtures of plasticizers and non-solubilizing organic diluents, mixtures of plasticizers and low-solubilizing organic diluents and mixtures of plasticizers and swelling organic diluents, said vinyl polymer consisting of polymerizates of monomers selected from the group consisting of ammonium salts of organic car-polymerizable monomers containing at least 80% vinylchloride, which polymerizates have been obtained by free-radical polymerization in an aqueous media in the presence of an anionic-active emulsifier selected from the group consisting of ammonium salts of organic carboxylic acids having from 8 to 22 carbon atoms, with the proviso that at some time before the termination of the drying of said vinyl polymer, from 10 to 95 mol percent of the ammonium ions in said organic carboxylic acid salts are replaced by cations of metals selected from the group consisting of metals of group Ia of the periodic system, metals of group IIa of the periodic system, cadmium and lead.

A further object of the invention is the development of a process for the obtention of vinyl polymers having controlled flow properties when made into vinyl pastes by polymerizing vinylchloride or mixtures of monomers containing at least 80% vinylchloride in the presence of a free-radical polymerization catalyst in an aqueous media in the presence of an anionic-active emulsifier selected from the group consisting of ammonium salts of organic carboxylic acids having from 8 to 22 carbon atoms, with the proviso that at some time before the termination of the drying of said vinyl polymer, from 10 to 95 mol percent of the ammonium ions in said organic carboxylic acid salts are replaced by cations of metals selected from the group consisting of metals of group Ia of the periodic system, metals of group IIa of the periodic system, cadmium and lead.

A further object of the invention is the obtention of vinyl pastes comprising (1) a vinyl polymer selected from the group consisting of polyvinylchloride and copolymers of vinylchloride containing at least 80% by weight of vinylchloride, said vinyl polymer having been obtained by free-radical polymerization in an aqueous media in the presence of an anionic-active emulsifier selected from the group consisting of ammonium salts of organic carboxylic acids having from 8 to 22 carbon atoms, with the proviso that at some time before the termination of the drying of said vinyl polymer, from 10 to 95 mol percent of the ammonium ions in said organic carboxylic acid salts are replaced by cations of metals selected from the group consisting of metals of group Ia of the periodic system, metals of group IIa of the periodic system, cadmium and lead, and (2) from about 15% to about 200% by weight, based on the weight of said vinyl polymer, of a softener selected from the group consisting of plasticizers, mixtures of plasticizers and non-solubilizing organic diluents, mixtures of plasticizers and low-solubilizing organic diluents and mixtures of plasticizers and swelling organic diluents.

These and other objects of the invention will become more apparent as the description thereof proceeds.

In the drawing comparative curves are presented showing the viscosities encountered by various plastisols produced according to the invention at different shear stresses.

I have now discovered a simple process for controlling the flow properties of a vinyl paste which is independent of the particle size and the particle size distribution of the polymerizate which is employed.

In accordance with the present invention polymers of vinylchloride or copolymers containing at least 80% by weight of vinylchloride which are capable of forming pastes are obtained by free-radical polymerization in an aqueous medium and in the presence of ammonium salts of organic carboxylic acids having from 8 to 22 carbon atoms as anionic-active emulsifiers by either before, during or after said polymerization, but at some time before termination of the drying of the polymers, replacing 10 to 95 mol percent of the ammonium ions in the organic carboxylic acid salts by cations of metals of groups Ia and IIa of the periodic system, or of cadmium or lead.

For the preparation of copolymers of vinylchloride which may be used in accordance with the present invention, all monomers which can be copolymerized with vinylchloride according to known methods may be employed. However, preferred are those which contain only one polymerizable group, namely, the —CH=C< group. These monomers can be designated by the formula

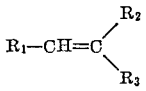

wherein $R_1$ is a radical selected from the group consisting of hydrogen, bromine,

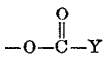

and

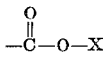

$R_2$ is a radical selected from the group consisting of hydrogen, chlorine and

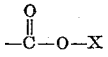

and together with $R_1$ form a radical selected from the group consisting of

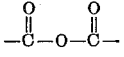

and

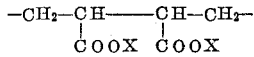

$R_3$ is a radical selected from the group consisting of hydrogen, chlorine, —$CH_3$,

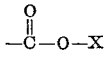

and

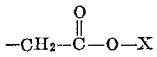

with the proviso that when $R_3$ is selected from the group consisting of hydrogen, chlorine and —$CH_3$, only one of $R_1$ and $R_2$ can represent hydrogen; Y is a radical selected from the group consisting of hydrogen, lower alkyl and phenyl; and X is a radical selected from the group consisting of hydrogen and alkyl having from 1 to 17 carbon atoms. Typical examples of these compounds are the following: vinylbromide, vinylidenechloride, vinyl esters of organic acids, such as vinyl formate, vinyl acetate, vinyl laurate and vinyl benzoate, acrylic compounds, such as methyl acrylate, methyl methacrylate, as well as unsaturated dicarboxylic acids, such as maleic acid, fumaric acid, methylene malonic acid, itaconic acid, citraconic acid or tetrahydrophthalic acid, and the mono- and diesters of these acids, such as dimethyl maleate, diethyl maleate and di-n-butyl maleate, mono-(2-ethylhexyl) maleate, dimethyl fumarate, diethyl fumarate, di-n-butyl fumarate, di-(2-ethylhexyl) fumarate and di-lauryl fumarate. Of course, it is also possible to prepare copolymers from more than two monomers, for example, the copolymer of 86% by weight vinylchloride, 13% by weight vinyl acetate and 1% by weight of maleic acid anhydride which copolymer may also be employed in the invention.

The anions of the organic carboxylic acid salts used in accordance with the invention should be derived from organic carboxylic acids having from 8 to 22 carbon atoms and containing no salt-forming or ion-forming groups other than the carboxyl group, that is, from organic carboxylic acids from which the anions which are usually found in anionic-active emulsifiers are derived.

Examples of such organic carboxylic acids having from 8 to 22 carbon atoms are the following: higher alkanoic acids, such as caprylic acid, lauric acid, myristic acid, palmitic acid and stearic acid; unsaturated higher fatty acids, such as oleic acid and linoleic acid; aliphatic, possibly unsaturated hydroxy carboxylic acids or hydroxylated higher fatty acids, such as hydroxy stearic acid and ricinoleic acid; the reaction products obtained by treatment of unsaturated higher fatty acids or unsaturated hydroxylated higher fatty acids, such as oleic acid or linoleic acid, with peracids, such as peracetic acid, according to German Patent 968,643 or published German application 1,107,657, the reaction products containing epoxy-stearic acid, dihydroxy-stearic acid and/or hydroxy-acetoxy-stearic acid. Additional examples are organic carboxylic acids which contain cyclo-alkyl radicals or cycloalkylalkanoic acids, such as cyclohexyl-propionic acid, and alkylaryl carboxylic acids, particularly alkyl-benzene carboxylic acids, such as p-tert.-butyl benzoic acid. However, the aliphatic carboxylic acids are preferred.

Except for the fact that, according to the invention, the monomer or monomers are polymerized in the presence of an anionic-active emulsifier mixture consisting of ammonium organic carboxylic acid salts and metal organic carboxylic acid salts or that after the polymerization with ammonium organic carboxylic acid salts as emulsifier, a portion of the ammonium salts is transformed into the corresponding metal salts, the polymerization in aqueous dispersion and the separation of the polymer dispersions obtained thereby is affected by methods customarily used in the production of polymers or copolymers of vinylchloride capable of forming pastes and having a particle size of 0.05 to 3µ, primarily 0.3 to 1.5µ. However, particularly preferred are those processes wherein the vinylchloride, optionally together with other monomers, is emulsified into a stable monomer dispersion in water which contains the emulsifier prior to heating to the polymerization temperature, and the emulsion thus obtained is polymerized in accordance with known methods with the aid of monomer-soluble polymerization catalysts. This may be accomplished according to or analogous to the methods described, for example in German Patents 962,834 and 1,069,387, as well as in British Patent 698,359 and in U.S. Patent 2,674,585.

Examples of monomer-soluble polymerization catalysts are benzoyl peroxide, lauroyl peroxide, 2,4-dichloro-benzoyl peroxide or azoisobutyric acid dinitrile, all of which may advantageously be used in combination with acetyl-cyclohexanesulfonyl peroxide. These monomer-soluble catalysts are employed in amounts of 0.1 to 5% by weight, advantageously 0.2 to 1% by weight, based on the weight of the monomer or monomers.

In place of the above polymerization process, even though it is less preferred, the so-called emulsion polymerization process may be employed in which the monomer or monomers are polymerized by known methods in aqueous dispersion in the presence of emulsifiers with the aid of water-soluble polymerization catalysts. Examples of water-soluble polymerization catalysts, that is, free radical-forming compounds, are $H_2O_2$ or ammonium persulfate. Other conventional water-soluble polymerization catalysts, such as potassium persulfate, contain metal cations which interact with the anionic-active emulsifiers and provision must be made for the presence of these cations when replacing part of the ammonium salt of the organic carboxylic acid emulsifiers according to the invention. These catalysts are employed in amounts of 0.01 to 5% by weight, advantageously 0.02 to 1% by weight, based on the weight of the monomer or monomers. If the emulsion polymeriaztion method using water-soluble polymerization catalysts is employed, a seeding procedure is advantageously followed. Through the use of seed latex, that is a pre-formed polymer emulsion prior to and during the final polymerization, only those amounts of emulsifier are used which do not exceed the amount necessary for covering the surface of the polymer molecules which may be present. Processes which are based upon this procedure are, for example, described in German Patent 843,163 and in French Patent 1,153,895.

In all cases the polymerization is effected under the temperature conditions which are customary for the free-radical polymerization of vinylchloride, that is, between about room temperature to 100° C., preferably at about 35 to 60° C.

Water is advantageously used in amounts of 50 to 400% by weight, based upon the monomer or monomers.

The total amount of ammonium organic carboxylic acid salts alone or with metal organic carboxylic acid salts, used as anionic-active emulsifiers, amounts to 0.1 to 5% by weight, preferably 0.2 to 3% by weight and especially 0.4 to 1.5% by weight, always based upon the weight of the monomer or monomers.

Non-ionic emulsifiers may optionally be used concurrently with the anionic emulsifiers in the polymerization process in amounts of 5 to 200%, based upon the total weight of the anionic emulsifier organic carboxylic acid salts. Examples of non-ionic emulsifiers are partial fatty acid esters of polyvalent alcohols, such as glycerin monosterate, sorbitol monolaurate or sorbitol monopalmitate; partial fatty alcohol ethers of polyvalent alcohols; polyoxyethylene ethers of fatty alcohols or aromatic hydroxy compounds; as well as polypropylene oxide-polyethylene oxide-condensation products which are sold under the trade name "Pluronics."

Metals whose cations are employed according to the invention to partly substitute for the ammonium cations in the emulsifier organic carboxylic acid salts are the alkali metals of group Ia of the periodic system such as lithium, sodium, potassium, rubidium and cesium; the alkaline earth metals of group IIa of the periodic system such as beryllium, magnesium, calcium, strontium and barium; as well as cadmium and lead. Because of their ready accessibility, sodium, potassium, magnesium and calcium are preferred.

The essential feature of the process according to the present invention is that at some time before the termination of the drying of the polymerizate a mixture of 5 to 90 mol percent of ammonium salts and 95 to 10%, preferably 20 to 70 mol percent, of metal salts of the organic carboxylic acids having from 8 to 22 carbon atoms is present in the polymerizate. This condition can be achieved by means of any or all of the following measures.

(a) The mixture of ammonium organic carboxylic acid salt and metal organic carboxylic acid salt is already present in the starting composition prior to the polymerization. This procedure is advantageous primarily if the metal organic carboxylic acid salts are water-soluble, that is, when between 0° to 70° C. no more than 30 parts by weight of water are necessary to dissolve 1 part by weight of the metal organic carboxylic acid salt.

(b) Prior to or at the beginning of the polymerization the emulsifier organic carboxylic acid salts are present exclusively in the form of ammonium salts and during or after the polymerization, but before termination of the drying of the polymer, 5 to 90 mol percent, preferably 20 to 70 mol percent, of the ammonium salts are transformed into the corresponding metal organic carboxylic acid salts by addition of suitable compounds of metals of groups Ia and IIa of the periodic system or of cadmium or lead.

Metal compounds suitable for this purpose are primarily alkali metal or alkaline earth metal oxides or hydroxides, such as sodium hydroxide, potassium hydroxide, magnesium oxide and calcium hydroxide; the metal salts of acids whose ammonium salts are volatile, such as sodium carbonate, sodium bicarbonate, sodium acetate, sodium chloride; as well as metal salts whose anions are derived from any desired type of acid, but whose metal cations form relatively insoluble compounds with organic carboxylic acids having from 8 to 22 carbon atoms, such as calcium acetate. In order to achieve as favorable electrical values in the final fused article as possible, it is advantageous to select compounds for this purpose which do not contain anions which may interfere with the electrical properties in the end products. The subsequent transformation of a portion of the ammonium organic carboxylic acid emulsifier salts into metal salts is thus effected preferably with the aid of metal hydroxides.

Metal compounds, such as those of cadmium, whose cations form difficultly soluble or practically insoluble compounds with organic carboxylic acids having 8 to 22 carbon atoms in water at temperatures between 0° to 70° C., that is, compounds which require more than 100 parts by weight of water to dissolve 1 part by weight, are advantageously applied to the filter cakes or to the moist polymers coming out of the centrifuges, if the separation is accomplished by filtration by means of aspirators, suction or pressure filters or centrifuges, prior to drying the polymers with the aid of, for example, disc dryers, drum dryers or moving gas dryers. If the separation is effected by means of heated roll dryers or spray dryers, such metal compounds are added immediately before or during the drying procedure, preferably dissolved or dispersed in water, from a second nozzle, for instance.

Plastisols or organosols may be prepared from the polymerizates produced in accordance with the invention by known methods, such as by admixing them with plasticizers, optionally with concurrent use of volatile and/or non-volatile non-solubilizing or slightly-solubilizing or swelling organic diluents. In this process, customary additives for plastisols and organosols, such as stabilizers, dyes, pigments and fillers may be employed.

Plasticizers which may be used are all monomeric and polymeric compounds which are customarily employed as plasticizers for polyvinylchloride and its copolymers (see H. Gnamm—W. Sommer "Die Lösungsmittel und Weichmachungsmittel," Stuttgart 1958, pp. 589–735). Preferred are high boiling point esters of completely esterified di- and tricarboxylic acids as well as completely esterified polyvalent inorganic acids, such as di-n-butyl phthalate, di-2-ethylhexyl phthalate, diethyl sebacate, triethyl citrate or tricresyl phosphate.

The plasticizers are employed in plastisols in amounts of 15 to 200% by weight, preferably 15 to 100% by weight, based on the weight of the vinyl polymers.

As is well known for the preparation of organosols, in addition to 10 to 50% by weight of plasticizers based on the weight of the vinyl polymers, there is added 10 to 50% by weight, also based on the weight of the vinyl polymers, of non-volatile, non-solubilizing or only slightly-solubilizing or swelling organic diluents. In addition, volatile diluents may also be used in any desired amounts since, on account of their volatility, they are no longer present in the finished articles produced from the organosols. A typical organosol may contain high boiling point esters as plasticizers, petroleum extracts with a boiling point above 125° C. at 1 mm./Hg as non-volatile diluents and hydrocarbons having a boiling point in the range of 35 to 250° C. as volatile diluents, as suggested in German Patent 918,659.

The dispersions prepared with the aid of the mixtures produced in accordance with the invention may be utilized in customary fashion by spreading, spraying, immersion or application with brushes on fabrics as well as for the production of molded shaped bodies and spongy materials.

The ratio of the ammonium salts to the metal salts of the organic carboxylic acids having from 8 to 22 carbon atoms, lying within the claimed range, depends upon the desired flow properties of the pastes which are obtained in known fashion from the vinyl polymers produced according to the invention. If the ratio of ammonium salt to metal salt is displaced in the direction of the metal salt, the flow properties of the plastisol become more pseudo-plastic.

The following examples are illustrative of the invention. They are not, however, to be construed as limiting the invention. Obviously, expedients known to those skilled in the art may be substituted for the specific embodiments hereinafter disclosed.

*Example 1*

In a glass-lined pressure vessel having a volume of 2 liters, 900 gm. of vinylchloride, 900 gm. of water purified by passage through ion exchange resins, 9 gm. of the ammonium salt of oxidized oleic acid and 0.9 gm. of lauryl peroxide were intensively admixed with the aid of a homogenizer according to Prof. Willems, which is sold under the trademark "Atomixmill." A stable emulsion of monomeric vinyl chloride in water was formed, which was then polymerized for 20 hours at 50° C. without stirring. Subsequently, the small amount of unreacted vinylchloride was blown off. The polymer dispersion thus obtained had a solids content of 45% by weight and a particle size range of 0.3 to $2\mu$, mainly $1\mu$, as determined by the electron microscope. This dispersion was divided into three parts:

(a) 500 cc. of this dispersion were worked up without additives by vacuum filtration, washing with salt-free water and drying the filter cake in a stream of warm air at 40° C. A paste consisting of 2 parts of the vinyl polymer and 1 part of di-2-ethylhexyl phthalate (DOP) had the flow properties corresponding to curve A of the drawing, as measured with the aid of a visco scale according to Höppler at 25° C. and special measuring device No. 3.

(b) Prior to the treatment described under (a) above, 500 cc. of the dispersion were modified by the addition of 0.25 cc. of 50% by weight aqueous sodium hydroxide. The paste produced from 2 parts of this vinyl polymer and 1 part of DOP have the flow properties corresponding to curve B of the drawing.

(c) Prior to the treatment described under (a) above, 0.4 cc. of 50% by weight aqueous sodium hydroxide solution were added to 500 cc. of the dispersion. The paste produced from 2 parts of this vinyl polymer and 1 part DOP had the flow properties which are reproduced in curve C.

Curve A has dilatant flow properties without a flow limit. Curve B exhibits weak pseudo-plastic flow properties with a clearly defined flow limit. Curve C is highly pseudo-plastic in its flow properties and exhibits a very sharp flow limit.

The ammonium salt of oxidized oleic acid, which was used in the above example, was prepared as follows. 86.4 gm. of a 50% by weight aqueous hydrogen peroxide solution were added, while stirring, over a period of 1½ hours at 75° C. to a mixture of 250 gm. of technical grade oleic acid, 30 gm. of glacial acetic acid and 7 gm. of 50% by weight aqueous sulfuric acid. After stirring the mixture for 3 additional hours at 75° C., it was washed with water at 65° C. The product obtained thereby had the following properties after drying:

| | |
|---|---:|
| Melting point, ° C. | [1] 63 |
| Iodine number | 1 |
| Acid number | 165 |
| Saponification number | 200 |
| Acetyl number | 1.51 |
| Epoxide oxygen content, percent | 0.1 |

[1] Clear melt.

It was transformed with the aid of aqueous ammonia into a 30% by weight solution of the ammonium salt in water.

*Example 2*

A polymerization mixture, consisting of 1,000 gm. of vinylchloride, 800 gm. of salt-free water, 6 gm. of ammonium laurate, 4 gm. of sodium laurate and 1 gm. of lauryl peroxide, was transformed into a stable monomer dispersion with the aid of a "Gaulin-Laboratory" homogenizer Type 15 M-8BA. After heating the monomeric dispersion for 25 hours at 50° C. in a pressure vessel made of stainless steel, a polymer dispersion was obtained comprising particles having a particle size range of 0.3 to $1.5\mu$. The polymer dispersion was vacuum filtered and the filter cake thus obtained was dried at 40° C. in a drying chamber. A paste produced from two parts of the dry vinyl polymer and one part of DOP had flow properties which correspond to those shown in curve C.

*Example 3*

500 kg. of vinylchloride containing 0.1% lauryl peroxide, and 500 kg. of salt-free water having dissolved therein 4 kg. of ammonium dihydroxystearate were introduced at a rate of 1000 kg. per hour by means of metering pumps made of stainless steel (V2A-steel) into a 6-step centrifugal pump, which in turn forced the starting mixture under a pressure of 15 atmospheres through a nickel nozzle having 500 holes of 0.3 mm. diameter into an autoclave having a capacity of 5 cubic meters. The contents of the autoclave were maintained at 45° C. for 30 hours. During this period the contents were stirred with a paddle stirrer at a rate of 15 r.p.m. Thereafter, the pressure was released from the autoclave and the dispersion was filtered on a suction cell filter to remove the major portion of its water. To the filter cake, which had a water content of 22%, 725 gm. of a 20% by weight aqueous calcium hydroxide suspension were added per 100 kg. of polyvinylchloride. The moist polymer was then dried with the aid of a moving air dryer. A paste produced from 2 parts of this vinyl polymer and 1 part of DOP had flow properties similar to those shown in curve C.

*Example 4*

A dispersion having a solids content of 46% by weight, which had been produced by the method described in Example 3, was admixed with 50 gm. of sodium acetate per 100 kg. of dispersion, and the mixture was dried with the aid of a spray dryer. A paste prepared from 2 parts of this vinyl polymer and 1 part of DOP had flow properties corresponding to those of curve B. If the dispersion is dried in the spray dryer without the addition of additives, the paste prepared from 2 parts of this vinyl polymer and 1 part of DOP has a flow curve corresponding to curve A.

*Example 5*

The procedure described in Example 2 was repeated, except that instead of 1,000 gm. of vinylchloride, 900 gm. of vinylchloride and 100 gm. of vinylidenechloride were used as the monomer charge. The copolymer obtained thereby had a flow curve similar to that represented by curve C in the attached drawings.

While I have disclosed specific embodiments of the invention, it will be readily apparent to one skilled in the art that the present invention is not limited to these specific embodiments and that various changes and modifications may be made without departing from the spirit of the invention and the scope of the appended claims.

I claim:

1. The process of claim 6, wherein after said polymerization, but before termination of said drying step, 20 to 70 mol percent of metal hydroxides selected from the group consisting of alkali metal hydroxides and alkaline earth metal hydroxides, based on the ammonium ions in said ammonium salt, are added to the still moist polymerization mixture.

2. A dried vinyl polymer selected from the group consisting of vinylchloride homopolymer and copolymers containing at least 80% by weight of vinylchloride, said vinyl polymer being adapted for the preparation of dispersions with at least one softener for vinyl polymers and having been prepared by free-radical polymerization in the presence of about 0.1% to 5% based on the weight of monomer charged of an anionic emulsifier, said emulsifier comprising at least one ammonium salt of organic monocarboxylic acids having from 8 to 22 carbon atoms, with the proviso that at some time before the termination of the drying of said vinyl polymer, sufficient ions of metals selected from the group consisting of metals of group Ia of the periodic system, metals of group IIa of the periodic system, cadmium and lead are added to replace from 20% to 70% of the ammonium ions in said ammonium salt in the undried polymer.

3. The vinyl polymer of claim 2, said polymer having been prepared in the presence of said metal ions and said ammonium ions, said metal ions having been added before the polymerization reaction was initiated.

4. The vinyl polymer of claim 2, said metal ions having been added after the initiation of, but before the termination of, the polymerization reaction.

5. The vinyl polymer of claim 2, said polymer having been prepared in the presence of said ammonium salt as the sole type of anionic emulsifier and said metal ions having been added subsequent to said polymerization reaction but before the termination of the drying step.

6. The process of producing a dried vinyl polymer selected from the group consisting of vinylchloride homopolymer and copolymers containing at least 80% by weight of vinylchloride, said vinyl polymer being adapted for the preparation of dispersions with at least one softener for vinyl polymers, which comprises the steps of mixing at least one monomer selected from the group consisting of vinylchloride and mixtures of vinylchloride with monomers copolymerizable therewith, said mixtures containing at least 80% vinylchloride, with water in the presence of a free-radical polymerization catalyst and from about 0.1% to 5%, based on the weight of said monomer, of at least one ammonium salt of organic carboxylic acids having from 8 to 22 carbon atoms, heating said mixture to a temperature between about room temperature and 100° C. and maintaining said temperature for a time sufficient to effect polymerization, dewatering the polymer dispersion, and drying the recovered vinyl polymer, with the proviso that at some time before the termination of the drying of said vinyl polymer, sufficient ions of metals selected from the group consisting of metals of group Ia of the periodic system, metals of group IIa of the periodic system, cadmium and lead are added to replace 20% to 70% of the ammonium ions in said ammonium salt in the undried polymer.

7. The process for producing a dried vinyl polymer selected from the group consisting of vinylchloride homopolymer and copolymers containing at least 80% by weight of vinylchloride, said vinyl polymer being adapted for the preparation of dispersions with at least one softener for vinyl polymers, which comprises the steps of mixing at least one monomer selected from the group consisting of vinylchloride and mixtures of vinylchloride with monomers copolymerizable therewith, said mixture containing at least 80% vinylchloride, with water in the presence of a monomer-soluble, free-radical polymerization catalyst and from about 0.1% to 5% based on the weight of said monomer, of at least one ammonium salt or organic carboxylic acids having from 8 to 22 carbon atoms, to form a stable aqueous monomer dispersion, heating said stable dispersion to a temperature between about room temperature and 100° C. and maintaining said temperature for a time sufficient to effect polymerization, dewatering the polymer dispersion and drying the recovered vinyl polymer, with the proviso that at some time before the termination of the drying of said vinyl polymer, sufficient ions of metals selected from the group consisting of metals of group Ia of the periodic system, metals of group IIa of the periodic system, cadmium and lead are added to replace from 20% to 70% of the ammonium ions in said ammonium salt in the undried polymer.

8. The process of producing a dried vinyl polymer selected from the group consisting of vinylchloride homopolymer and copolymers containing at least 80% by weight of vinylchloride, said vinyl polymer being adapted for the preparation of dispersions with at least one softener for vinyl polymers, which comprises the steps of mixing at least one monomer selected from the group consisting of vinylchloride and mixtures of vinylchloride with monomers copolymerizable therewith, said mixtures containing at least 80% vinylchloride, with water in the presence of a free-radical polymerization catalyst and from about 0.1% to 5%, based on the weight of said monomer, of an anionic-active emulsifier mixture consisting of (1) 20 to 70 mol percent of at least one ammonium salt of organic carboxylic acids having from 8 to 22 carbon atoms and (2) 80 to 30 mol percent of at least one salt of metals of group Ia of the periodic system with organic carboxylic acids having from 8 to 22 carbon atoms, heating said mixture to a temperature between about room temperature and 100° C. and maintaining said temperature for a time sufficient to effect polymerization, dewatering the polymer dispersion, and drying the recovered vinyl polymer.

References Cited by the Examiner
UNITED STATES PATENTS

| | | | |
|---|---|---|---|
| 2,674,585 | 4/1954 | Condo et al. | 260—23 |
| 2,823,156 | 2/1958 | Hedges | 260—23 |
| 2,852,482 | 9/1958 | Graham | 260—23 X |
| 2,957,858 | 10/1960 | O'Donnell | 260—92.8 |
| 2,981,724 | 4/1961 | Holdsworth | 260—92.8 |
| 3,068,184 | 12/1962 | Noorduyn et al. | 260—23 |

LEON J. BERCOVITZ, *Primary Examiner.*

R. C. STEWART, R. A. WHITE, *Assistant Examiners.*